United States Patent
MacDonald

(10) Patent No.: US 11,480,102 B2
(45) Date of Patent: Oct. 25, 2022

(54) GEARBOX MECHANICALLY COUPLED FUEL CELL AND $CO_2$ COMBINED CYCLE POWER GENERATION

(71) Applicant: Hamilton Sundstrand Corporation, Charlotte, NC (US)

(72) Inventor: Malcolm MacDonald, Bloomfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/236,464

(22) Filed: Apr. 21, 2021

(65) Prior Publication Data

US 2021/0340910 A1    Nov. 4, 2021

Related U.S. Application Data

(60) Provisional application No. 63/018,888, filed on May 1, 2020.

(51) Int. Cl.
*F02C 6/02*       (2006.01)
*F02C 6/20*       (2006.01)
(Continued)

(52) U.S. Cl.
CPC .................. *F02C 6/02* (2013.01); *F02C 6/20* (2013.01); *H01M 8/04201* (2013.01);
(Continued)

(58) Field of Classification Search
CPC .... F02C 6/00; F02C 6/02; F02C 6/20; H01M 8/04201; H01M 2250/20; F05D 2210/12;
(Continued)

(56) References Cited

U.S. PATENT DOCUMENTS

2004/0088993 A1*  5/2004  Radcliff ................ F01K 23/10
                                                        60/39.182
2006/0222919 A1* 10/2006  Tanaka .............. H01M 8/04022
                                                        429/414
(Continued)

FOREIGN PATENT DOCUMENTS

KR         2016066539 A      6/2016
KR        20170034719 A      3/2017
WO       WO2019165807 A1     9/2019

OTHER PUBLICATIONS

Extended European Search Report for EP Application No. 21171552.9, dated Sep. 24, 2021, 5 pages.

*Primary Examiner* — Steven M Sutherland
(74) *Attorney, Agent, or Firm* — Kinney & Lange, P.A.

(57) ABSTRACT

A combined cycle power generation system for an aircraft includes fuel cell and supercritical $CO_2$ cycles. The fuel cell cycle includes a compressor and turbine disposed on a first shaft, a fuel cell in fluid communication with the compressor and a fuel source, and a combustor in fluid communication with the fuel cell and the turbine. The combustor is configured to combust partially spent fuel from the fuel cell and produce combustion exhaust gas for delivery to the turbine. The supercritical $CO_2$ cycle includes a compressor and turbine disposed on a second shaft, a supercritical $CO_2$ fluid circuit in thermal communication with the combustor and configured to deliver $CO_2$ to the turbine and compressor, and a heat exchanger in thermal communication with the supercritical $CO_2$ fluid circuit and a source of cooling fluid. A mechanical linkage is configured to transfer power from the second shaft to the first shaft.

20 Claims, 4 Drawing Sheets

(51) Int. Cl.
*H01M 8/04082* (2016.01)
*F16H 57/02* (2012.01)

(52) U.S. Cl.
CPC .... *F05D 2210/12* (2013.01); *F05D 2220/323* (2013.01); *F05D 2220/70* (2013.01); *F05D 2260/4031* (2013.01); *F16H 57/02* (2013.01); *F16H 2057/02034* (2013.01); *F16H 2057/02039* (2013.01); *H01M 2250/20* (2013.01)

(58) Field of Classification Search
CPC ........... F05D 2220/323; F05D 2220/70; F05D 2260/4031; F16H 57/02; F16H 2057/02034; F16H 2057/02039; F01K 23/06; F01K 23/08
See application file for complete search history.

(56) References Cited

U.S. PATENT DOCUMENTS

| | | |
|---|---|---|
| 2012/0117979 A1* | 5/2012 | Facchinetti ............. F02C 3/205 60/801 |
| 2012/0153076 A1 | 6/2012 | Burns et al. |
| 2014/0150443 A1* | 6/2014 | Laing ..................... F01K 23/10 60/774 |
| 2017/0226901 A1 | 8/2017 | Stapp |
| 2019/0063315 A1 | 2/2019 | Jung et al. |

\* cited by examiner

GEARBOX MECHANICALLY COUPLED FUEL CELL AND CO$_2$ COMBINED CYCLE POWER GENERATION

CROSS-REFERENCE TO RELATED APPLICATION(S)

This application claims the benefit of U.S. Provisional Application No. 63/018,888 filed May 1, 2020 for "GEARBOX MECHANICALLY COUPLED FUEL CELL AND CO2 COMBINED CYCLE POWER GENERATION" by M. MacDonald.

BACKGROUND

The present disclosure is directed generally to a power generation system for an aircraft, and more particularly to a combined cycle power generation system for an aircraft.

Eco-friendly flight is increasingly important as governments increase regulations on emissions, such as NOx, CO$_2$, and sulfur dioxides, near cities. A conventional gas turbine engine for a single-aisle aircraft ha a high power density but low efficiency (around 52%). To reduce fuel consumption, means for power generation must become either lighter in weight or more fuel efficient. Power density gains through existing gas turbine engine technologies have brought small benefit. A need exists for a power generation system that substantially increases overall power generation efficiency and reduces fuel consumption to meet more stringent emissions regulations.

SUMMARY

In one aspect, a combined cycle power generation system for an aircraft includes fuel cell and supercritical CO$_2$ cycles. The fuel cell cycle includes a compressor and turbine disposed on a first shaft, a fuel cell in fluid communication with the compressor and a fuel source, and a combustor in fluid communication with the fuel cell and the turbine. The combustor is configured to combust partially spent fuel from the fuel cell and produce combustion exhaust gas for delivery to the turbine. The supercritical CO$_2$ cycle includes a compressor and turbine disposed on a second shaft, a supercritical CO$_2$ fluid circuit in thermal communication with the combustor and configured to deliver CO$_2$ to the turbine and compressor, and a heat exchanger in thermal communication with the supercritical CO$_2$ fluid circuit and a source of cooling fluid. A mechanical linkage is configured to transfer power from the second shaft to the first shaft.

In another aspect, a method of powering an aircraft includes operating a fuel cell cycle, operating a supercritical CO$_2$ cycle, and transferring power from the supercritical CO$_2$ cycle to the fuel cell cycle. Operating a fuel cell cycle includes drawing air into a first compressor, heating the air to a temperature of at least 600 degrees Celsius, delivering the air and a fuel to a fuel cell, reacting the air and fuel to generate power, delivering unburned fuel from the fuel cell to a combustor, burning the fuel in the combustor to produce an exhaust gas, and delivering the exhaust gas to a first turbine, wherein the first turbine drives the first compressor. Operating a supercritical CO$_2$ cycle includes circulating CO$_2$ in a fluid circuit, wherein circulating the CO$_2$ comprises heating the CO$_2$, expanding the heated CO$_2$ through a second turbine, cooling the CO$_2$ exiting the second turbine, and compressing the cooled CO$_2$.

The present summary is provided only by way of example, and not limitation. Other aspects of the present disclosure will be appreciated in view of the entirety of the present disclosure, including the entire text, claims, and accompanying figures.

Figure 1:
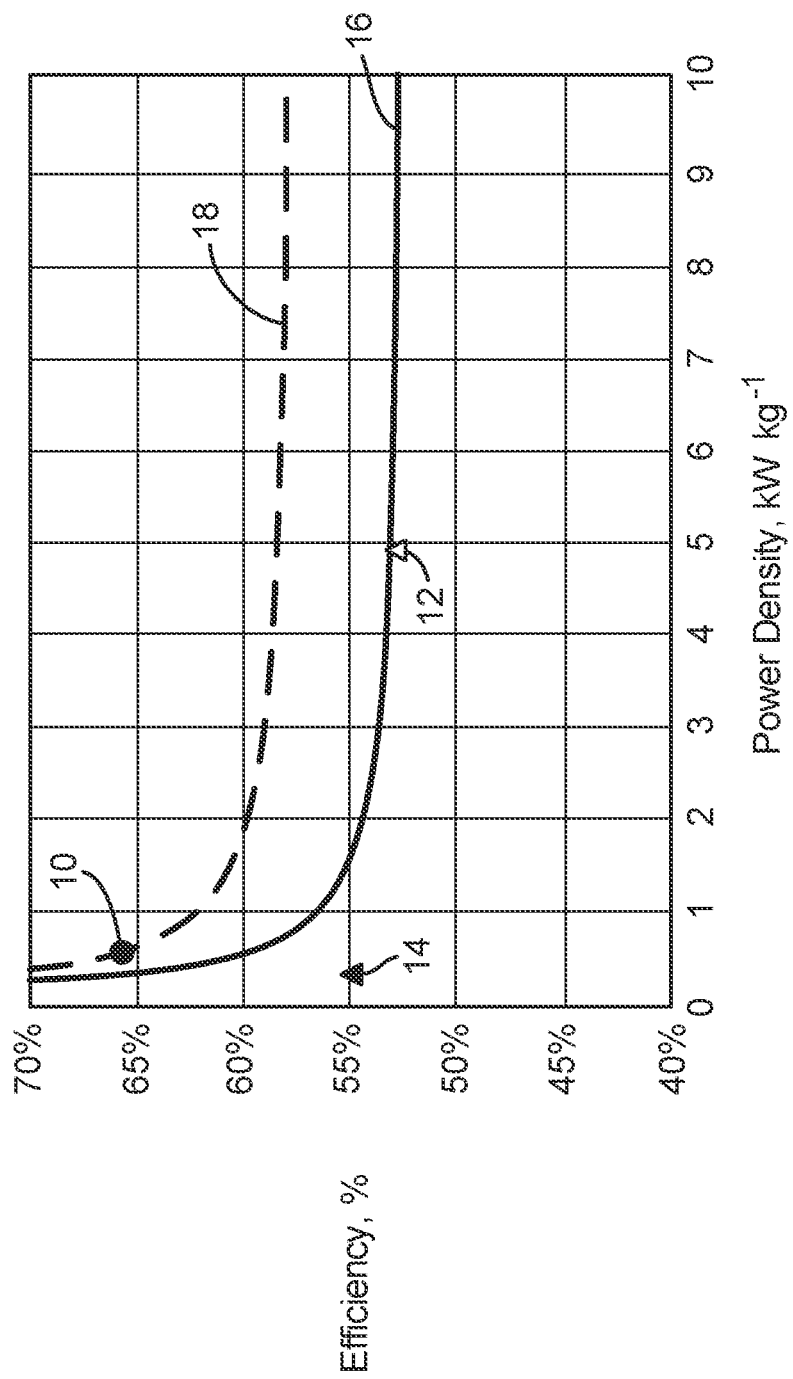
FIG. 1 is a plot of energy efficiency versus power density for a combined cycle power generation system in comparison to a conventional gas turbine engine and solid oxide fuel cell.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Eco-friendly flight is increasingly important as governments increase regulations on emissions, such as NOx, CO$_2$, and sulfur dioxides, near cities. An efficient combined cycle shares generated power between a supercritical CO$_2$ loop and an air breathing loop used to feed a fuel cell. The disclosed combined cycle power generation systems include a topping fuel cell cycle with a combustion stage and bottoming supercritical CO$_2$ cycle. The disclosed combined cycle power generation systems provide higher power generation efficiency with reduced emissions as compared to gas turbine engines and provide onboard power generation with flexible propulsion modes.

FIG. 1 is a plot of energy efficiency versus power density for a combined cycle power generation system 10 according to the present disclosure in comparison to a conventional gas turbine engine 12. FIG. 1 shows efficiency (%) versus power density (kW/kg) for combined cycle power generation system 10 with a solid oxide fuel cell cycle and supercritical CO$_2$ cycle, a single-aisle aircraft with a conventional gas turbine engine 12, and a solid oxide fuel cell 14. Lines 16 and 18 represent a baseline fuel burn and fuel burn benefit, respectively. The fuel burn benefit is the reduction in the amount of fuel consumed over the baseline. Both lines 16 and 18 represent the amount of fuel consumed in 2000 miles of aircraft flight. Line 16 is a baseline fuel burn for the conventional gas turbine engine 12. Line 18 is the fuel burn for combined cycle 10, which represents a 10% benefit over the baseline 16.

As illustrated in FIG. 1, the conventional gas turbine engine 10 has a high power density but low efficiency (approximately 52%). To achieve a fuel burn benefit, power generation must either be lighter weight to achieve a higher power density or more efficient. A solid oxide fuel cell 14 has a lower power density and is only slightly more efficient than the conventional gas turbine engine 12. However, when combined with a supercritical $CO_2$ cycle, as provided by the combined cycle power generation system 10, efficiency is substantially increased. The supercritical $CO_2$ cycle increases the power density of the combined cycle and increases the overall power generation efficiency. This increased efficiency translates to a 10% fuel burn benefit over the conventional gas turbine engine 12.

Figure 2:
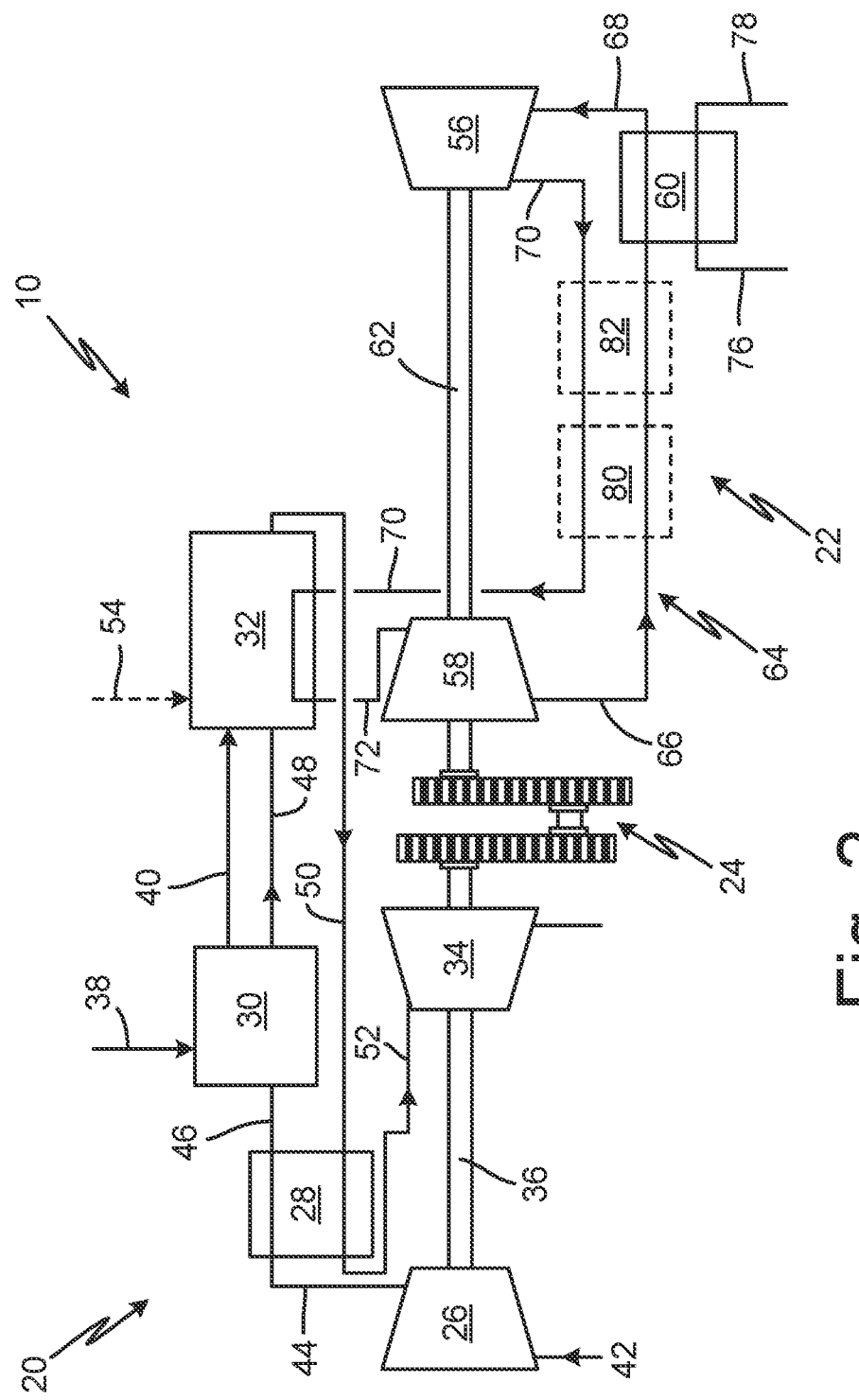
FIG. 2 is a schematic diagram of the combined cycle power generation system described with respect to FIG. 1.

FIG. 2 is a schematic diagram of combined cycle power generation system 10 according to one embodiment of the present disclosure. Combined cycle power generation system 10 includes fuel cell cycle 20, supercritical $CO_2$ cycle 22, and gearbox 24. Fuel cell cycle 20 includes compressor 26, recuperative heat exchanger (referred to hereinafter as "recuperator") 28, solid oxide fuel cell 30, combustor 32, turbine 34, shaft 36, fuel input 38, partially spent fuel input 40, air input 42, air lines 44, 46, 48, and exhaust lines 50 and 52. Fuel cell cycle 20 optionally includes supplemental fuel input 54. Supercritical $CO_2$ cycle 22 includes compressor 56, turbine 58, heat exchanger 60, shaft 62, and supercritical fluid circuit 64. Supercritical fluid circuit 64 includes a series of supercritical $CO_2$ fluid lines 66, 68, 70, 72 configured to deliver supercritical $CO_2$ between and/or through components. Heat exchanger 60 includes air input 76 and outlet 78. Supercritical $CO_2$ cycle 22 optionally includes one or more recuperative heat exchangers (hereinafter referred to as "recuperators") 80 and 82.

Compressor 26 and turbine 34 are disposed on shaft 36. Compressor 56 and turbine 58 are disposed on shaft 62. Shaft 36 is mechanically coupled to shaft 62 via gearbox 24. Solid oxide fuel cell 30 is in fluid communication with compressor 26 and a source of fuel denoted by fuel input 38. Combustor 32 is in fluid communication with solid oxide fuel cell 30 and turbine 34 and, optionally, in fluid communication with a source of supplemental fuel denoted by supplemental fuel input 54. Recuperator 28 is in fluid communication with combustor 32 and compressor 26 via exhaust line 50 and air line 44, respectively. Recuperator 28 is in fluid communication with turbine 34 via exhaust line 52.

Supercritical $CO_2$ fluid circuit 64 is in thermal communication with combustor 32 and is configured to deliver supercritical $CO_2$ to turbine 58 and compressor 56. Supercritical $CO_2$ fluid circuit 64 fluidly connects an outlet of turbine 58 to an inlet of compressor 56 and fluidly connects an outlet of compressor 56 to an inlet or turbine 58. Heat exchanger 60 is in thermal communication with supercritical $CO_2$ fluid circuit 64 and a source of cooling air denoted by air input 76. Heat exchanger 60 is disposed between an outlet of turbine 58 and an inlet of compressor 56 via fluid lines 66 and 68. An outlet of turbine 58 is in fluid communication with an inlet of heat exchanger 60 via fluid line 66. An outlet of heat exchanger 60 is in fluid communication with an inlet of compressor 56 via fluid line 68. Supercritical $CO_2$ fluid circuit 64 fluidly connects an outlet of compressor 56 to combustor 32 via fluid line 70 and fluidly connects combustor 32 to an inlet of turbine 58 via fluid line 72.

Fuel cell cycle 20 is the primary energy powering cycle or topping cycle of combined power generation system 10. Fuel cell cycle 20 combines fuel cell 30 with combustor 32 to burn unconverted fuel from fuel cell 30 to increase temperature of waste heat from solid oxide fuel cell 30. Supercritical $CO_2$ cycle 22 is a bottoming Brayton cycle that accepts the high temperature heat and converts the heat to mechanical power, which is used to provide additional power to fuel cell cycle 20 as required to drive compressor 26.

During operation of combined cycle power generation system 10, fuel cell cycle 20 is operated by drawing air into compressor 26, heating air to a temperature of at least 600° C., delivering the air and fuel to solid oxide fuel cell 30, reacting the air and fuel to generate power, delivering unburned or partially spent fuel and air from solid oxide fuel cell 30 to combustor 32, burning the fuel in combustor 32 to produce combustion exhaust gas, and delivering the combustion exhaust gas to turbine 34, which is configured to drive compressor 26. Supercritical $CO_2$ cycle is operated by circulating supercritical $CO_2$ in a closed-loop fluid circuit, heating the supercritical $CO_2$ with heat from combustor 32, expanding the supercritical $CO_2$ through turbine 58, cooling the supercritical $CO_2$ exiting turbine 58 with heat exchanger 60, compressing the cooled supercritical $CO_2$ with compressor 56, and returning the supercritical $CO_2$ to combustor 32 to repeat the cycle. During operation combined cycle power generation system 10, power is transferred from supercritical $CO_2$ cycle 22 to fuel cell cycle 20 by connecting shaft 62 of supercritical $CO_2$ cycle 22 to shaft 36 of fuel cell cycle 20 via reduction gearbox 24.

During operation of fuel cell cycle 20, air is taken from low temperature and pressure air at altitude (30,000+ ft). Air is taken from outside of the aircraft by a scoop (not shown) and into compressor 26 where air is compressed to increase the temperature of the air. The compressed air is pumped through recuperator 28 via air line 44. The air accepts heat from an air exhaust stream of combustor 32 and increases in temperature. Combined, compressor 26 and recuperator 28 can increase the temperature of the air from approximately −40° C. (ambient) to 600° C. or higher, which is required for operation of solid oxide fuel cell 30.

Solid oxide fuel cell 30 can be a conventional solid oxide fuel cell as known in the art, including two electrodes separated by a solid oxide or ceramic electrolyte. Oxygen is reduced at the cathode to produce oxygen ions which diffuse through the electrolyte and oxidize fuel at the anode. Fuel can be a hydrogen-containing fuel including but not limited to reformed heavier hydrocarbons such as jet fuel or biofuels. The oxidant is atmospheric oxygen provided by air. Solid oxide fuel cell 30 directly converts fuel and the oxidant (air) into electricity through an electrochemical process with low levels of pollutant emissions (NOx, SOx, and $CO_2$). Solid oxide fuel cell 30 operates at high temperatures, generally ranging from 600° C. to 1000° C. During operation, the high temperature air passes through a fuel cell stack where it reacts with reformed fuel to produce electrical power and high temperature gas. Electricity produced by solid oxide fuel cell 30 can provide onboard power for the aircraft and aircraft propulsion.

High temperature gas, which includes unburned fuel from solid oxide fuel cell 30 (lines 40 and 48) passes to combustor 32 where it is burned at a relatively low temperature to minimize NOx and other emissions. In some embodiments, a supplemental fuel (line 54) can be supplied to combustor 32 to achieve a desired exhaust temperature at an exit of combustor 32. Heat generated by combustor 32 is used to increase a temperature of supercritical $CO_2$ in supercritical $CO_2$ fluid circuit 64. Combustion exhaust gases are pumped through exhaust line 50 to recuperator 28 where combustion exhaust gases exchange heat with compressed air. Recuperator 28 is configured to transfer thermal energy from combustion exhaust gases to compressed air received from compressor 26. Combustion exhaust gases exiting recuperator 28 are delivered to turbine 34 via exhaust line 52. Combustion exhaust gases are expanded through turbine 34, driving turbine 34 and thereby compressor 26 on shaft 36.

Expansion of combustion exhaust gases through turbine 34 can cause shaft 36 to rotate. Turbine power extracted from the combustion exhaust gases often does not offset the amount of work that is required to compress incoming air from outside of the aircraft. As such, additional power must be provided to drive compressor 26. The additional power is provided by supercritical $CO_2$ cycle 22.

Supercritical $CO_2$ cycle uses heat generated by fuel cell cycle 20 to drive turbine 58. Turbine 58 drives compressor 26 in fuel cell cycle 20 via a mechanical coupling (gearbox 24) between shafts 62 and 36. Supercritical $CO_2$ cycle 22 is like a Brayton cycle in which supercritical $CO_2$ is compressed in compressor 56, heated by combustor 32, and expanded through turbine 58 to generate power and drive compressor 56. Supercritical $CO_2$ fluid circuit 64 is a closed-loop circuit configured to deliver supercritical $CO_2$ from compressor 56 to combustor 32, where the supercritical $CO_2$ is heated by combustor 32, to turbine 58, where supercritical $CO_2$ is expanded to drive turbine 58 and compressor 56, and back to compressor 56. Although generally described herein as supercritical $CO_2$, the $CO_2$ can fall out of its supercritical state if, for example, the $CO_2$ is expanded below the critical pressure (7.4 MPa) through turbine 34 or cooled below the critical temperature (31° C.). In some embodiments, $CO_2$ can exist in both supercritical and subcritical states in supercritical $CO_2$ fluid circuit 64. For example, $CO_2$ can be in a supercritical state in some parts of circuit 64 (e.g., fluid line 70) and can be in a subcritical state in other parts of circuit 64 (e.g., fluid line 68 between heat exchanger 60 and compressor 56 if cooled below the critical temperature).

During operation, supercritical $CO_2$ is compressed by compressor 56 and delivered to combustor 32 via fluid line 68. Combustor 32 is configured to transfer thermal energy to the supercritical $CO_2$ in supercritical $CO_2$ fluid circuit 64. Combustor 32 can operate as a heat exchanger to transfer thermal energy to the supercritical $CO_2$. In some embodiments, supercritical $CO_2$ fluid circuit 64 can include one or more coiled fluid conduits or channels (not shown) disposed in combustor 32 through which the supercritical $CO_2$ flows. The coiled fluid conduits or channels increase residence time of the supercritical $CO_2$ in combustor 32 and surface area of the supercritical $CO_2$ fluid circuit to increase heat transfer to the supercritical $CO_2$ from combustor 32.

Supercritical $CO_2$ fluid circuit 64 is configured to deliver the heated supercritical $CO_2$ from combustor 32 to an inlet of turbine 58 via fluid line 72. The supercritical $CO_2$ expands through turbine 58, driving turbine 58 and thereby compressor 56 on shaft 62. Expansion of supercritical $CO_2$ through turbine 58 can cause shaft 62 to rotate at a speed greater than 100,000 RPM.

Supercritical $CO_2$ exits an outlet of turbine 58 and is delivered to heat exchanger 60 through fluid line 66. Heat exchanger 60 cools supercritical $CO_2$ to a desired compressor inlet temperature for compression in compressor 56. Cooling fluid in heat exchanger 60 can be low temperature ambient air taken from outside of the aircraft. Heat exchanger can include air inlet 76 configured to receive ambient low temperature air and air outlet 78 configured to exhaust the air back to the environment.

Compressor 56 is configured to compress supercritical $CO_2$ to a desired pressure. Following compression, supercritical $CO_2$ is returned to combustor 32, repeating the cycle.

In some embodiments, one or more recuperators 80, 82 (shown in phantom) can be incorporated into supercritical $CO_2$ cycle 22. The one or more recuperators 80, 82 can be disposed in series between turbine 58 and compressor 56 and can be configured to transfer heat from the supercritical $CO_2$ exiting turbine 58 to supercritical $CO_2$ exiting compressor 56. A single recuperator 80 can be disposed in fluid communication with the outlet of turbine 58, the inlet of compressor 56 via heat exchanger 60, and the outlet of compressor 56. A second recuperator 82 can optionally be incorporated between recuperator 80 and heat exchanger 60. Recuperators 80, 82 can be counter-flow or cross-flow heat exchangers as known in the art. Recuperative heat exchanger 82 can be disposed in fluid communication with the outlet of turbine 58 via recuperator 80, the inlet of compressor 56 via heat exchanger 60, and the outlet of compressor 56. Fluid line 66 can deliver supercritical $CO_2$ exiting turbine 58 to recuperator 80 and, subsequently, to recuperator 82. Fluid line 70 can deliver supercritical $CO_2$ exiting compressor 56 to recuperator 80 and, subsequently, to recuperator 82. Recuperative heat exchangers 80 and 82 can improve cycle efficiency by reducing an amount of heat loss to supercritical $CO_2$ attributed to heat exchanger 60, which is used to cool the supercritical $CO_2$ as necessary for compression. Use of one or more recuperators 80, 82 utilizes waste heat from the supercritical $CO_2$ exiting turbine 58 to preheat supercritical $CO_2$ exiting compressor 56 thereby reducing the amount of thermal energy needed to be supplied by combustor 32.

Energy extracted from supercritical $CO_2$ cycle 22 can be used to drive compressor 26 of fuel cell cycle 20. Shaft 62 of supercritical $CO_2$ cycle 22 can rotate at speeds greater than 100,000 RPM, which is significantly greater than the speed of shaft 36. Reduction gearbox 24 can be used to couple shaft 62 to shaft 36. Reduction gearbox 24 is configured to step down an input rotator speed of shaft 62 to achieve an output speed consistent with shaft 36 to transmit power between shaft 62 and shaft 36.

As disclosed, combined cycle power generation system 10 can achieve a power generation efficiency of 66%, which is an increase of 13% over a conventional gas turbine engine, and can provide a fuel burn benefit of 10% over a conventional gas turbine engine. Gearbox 24 provides direct conversion of mechanical power with an efficiency of approximately 99% when additional power must be supplied to drive compressor 26 of fuel cell cycle 20. Combined cycle power generation system 10 produces less emissions (NOx, Sox, and $CO_2$) than conventional gas turbine engines and provides for onboard power generation and distribution.

Figure 3:
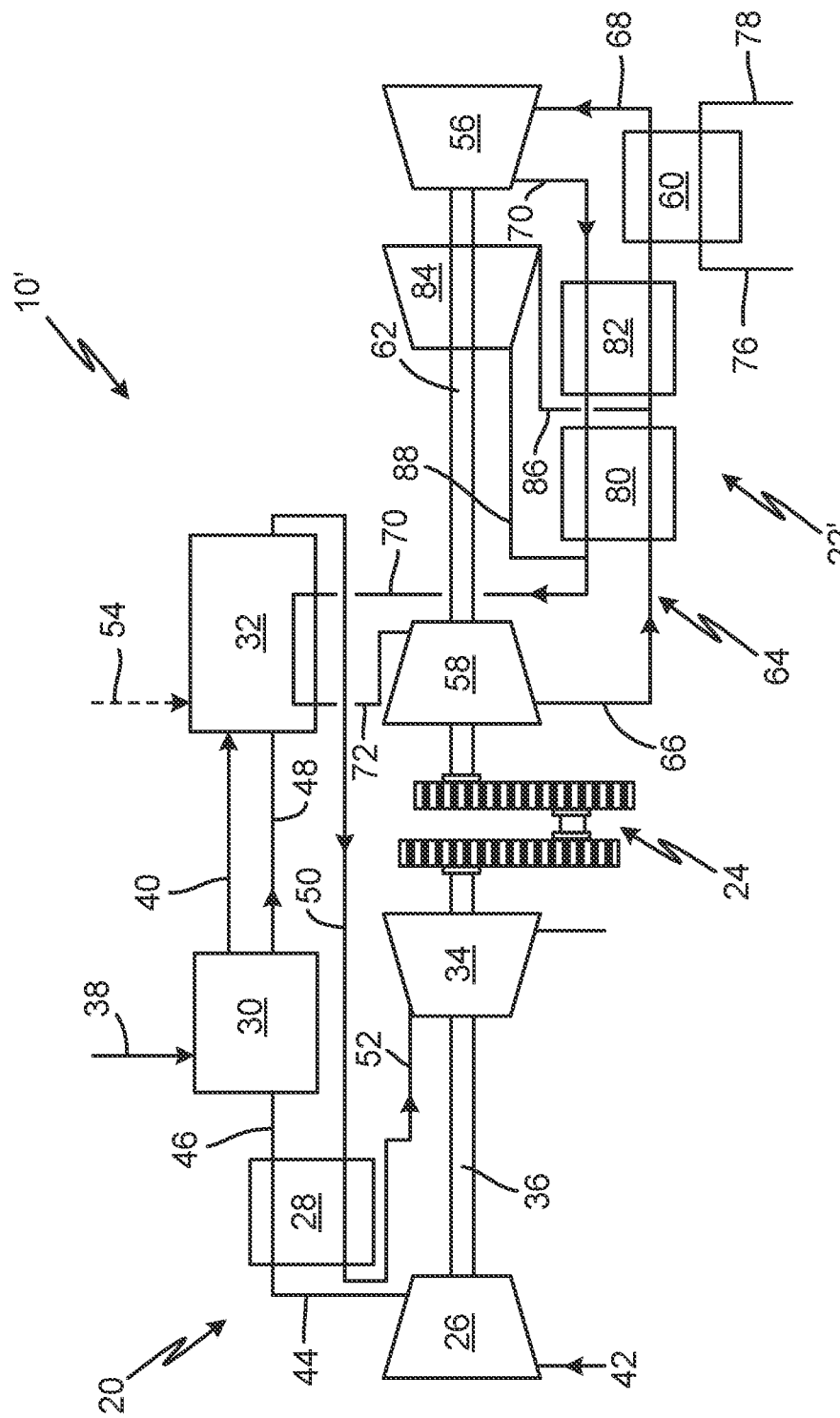
FIG. 3 is a schematic diagram of a combined cycle power generation system according to another embodiment of the present disclosure.

FIG. 3 is a schematic diagram of combined cycle power generation system 10'. Combined cycle power generation system 10' is substantially similar to combined cycle power generation system 10 with the incorporation of both recuperators 80 and 82, an additional compressor 84, and fluid lines 86 and 88 in supercritical $CO_2$ cycle 22'. Compressor 84 is in fluid communication with turbine 58 and in thermal communication with combustor 32. An inlet of compressor 84 is in fluid communication with an outlet of recuperator 80. An outlet of compressor 84 is in fluid communication with an outlet of recuperator 82. Fluid line 66, delivering supercritical $CO_2$ exiting turbine 58 is split at a location between recuperators 80 and 82 such that a portion of the supercritical $CO_2$ is delivered to recuperator 82 and a portion of the supercritical $CO_2$ is delivered to the inlet of compressor 84 via fluid line 86, thereby bypassing recuperator 82 and heat exchanger 60. Flow can be equally split between heat exchanger 82 and compressor 84.

During operation, supercritical $CO_2$ exiting turbine 58 is delivered to recuperator 80. Heat is transferred from the supercritical $CO_2$ exiting turbine 58 to the supercritical $CO_2$ exiting compressor 56 thereby at least partially cooling the supercritical $CO_2$ delivered from recuperator 80 to the inlet of compressor 84. Compressor 84 compresses the supercritical $CO_2$ to the desired pressure. Compressed supercritical $CO_2$ exiting compressor 84 is delivered via fluid line 88 to a location between recuperator 80 and combustor 32 where the compressed supercritical $CO_2$ from compressor 84 mixes with the compressed $CO_2$ from compressor 84. Supercritical $CO_2$ exiting compressor 84 is not heated by either recuperators 80 or 82. Supercritical $CO_2$ exiting compressor 84 is, instead, directed downstream of recuperator 80 and upstream of combustor 32. The heating capacity of recuperators 80 and 82 is thereby reserved for heating supercritical $CO_2$ that has been cooled by heat exchanger 60 and compressed by compressor 56. By directing a portion of the supercritical $CO_2$ from recuperator 80 to compressor 84 and thereby bypassing heat exchanger 60, a reduced portion of the supercritical $CO_2$ requires preheating before entering combustor 32.

As disclosed, combined cycle power generation system 10' can achieve a power generation efficiency of 66%, which is an increase of 13% over a conventional gas turbine engine, and can provide a fuel burn benefit of 10% over a conventional gas turbine engine. Gearbox 24 provides direct conversion of mechanical power with an efficiency of approximately 99% when additional power must be supplied to drive compressor 26 of fuel cell cycle 20. Combined cycle power generation system 10' produces less emissions (NOx, Sox, and $CO_2$) than conventional gas turbine engines and provides for onboard power generation and distribution.

Figure 4:
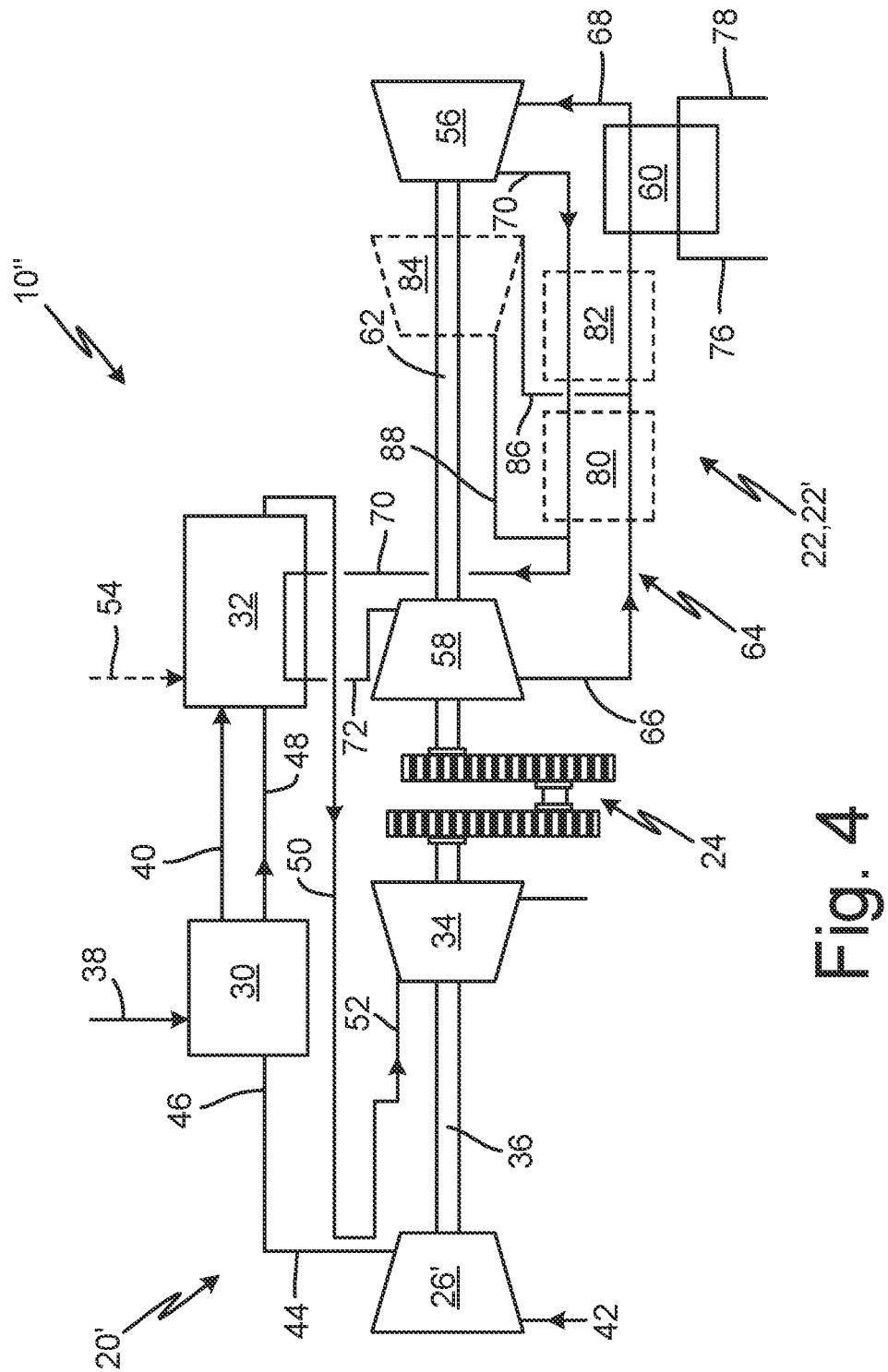
FIG. 4 is a schematic diagram of a combined cycle power generation architecture according to yet another embodiment of the present disclosure.

FIG. 4 is a schematic diagram of combined cycle power generation system 10". Combined cycle power generation system 10" is substantially similar to both combined cycle power generation systems 10 and 10' including either supercritical $CO_2$ 22 or 22' and with modified fuel cell cycle 20', which includes the removal of recuperator 28 from fuel cell cycle 20 and replacement of compressor 26 with compressor 26'. Recuperators 80 and 82, compressor 84, and lines 86 and 88 are shown in phantom. Combined cycle power generation system 10" can include one or both recuperators 80 and 82 as disclosed with respect to combined cycle power generation system 10 or can include both recuperators 80 and 82 with compressor 84 and fluid lines 84 and 86 as disclosed with respect to combined cycle power generation system 10'.

In combined cycle power generation system 10", compressed air from compressor 26' is pumped directly to fuel cell 30. Compressor 26' is capable of increasing temperature of the air entering compressor 26' to the required inlet temperature of solid oxide fuel cell 30. In the present disclosure, compressor 26' is capable of increasing the temperature of air entering compressor 26', which is approximately −40° C. at high altitude, to at least 600° C. for operation of solid oxide fuel cell 30. Use of compressor 26' eliminates the need for recuperator 28 to heat compressed air exiting compressor 26'. In the absence of recuperator 28, combustion exhaust gases from combustor 32 can be delivered directly to turbine 34. Because the combustion exhaust gases do not transfer heat to the compressed air exiting compressor 26', combustion exhaust gases are at a higher temperature entering turbine 34, which can improve turbine efficiency.

As disclosed, combined cycle power generation system 10" can achieve a power generation efficiency of 66%, which is an increase of 13% over a conventional gas turbine engine, and can provide a fuel burn benefit of 10% over a conventional gas turbine engine. Gearbox 24 provides direct conversion of mechanical power with an efficiency of approximately 99% when additional power must be supplied to drive compressor 26 of fuel cell cycle 20'. Combined cycle power generation system 10" produces less emissions (NOx, SOx, and $CO_2$) than conventional gas turbine engines and provides for onboard power generation and distribution.

As disclosed, multiple combined cycle power generation system configurations are contemplated. Each of combined cycle power generation systems 10, 10', and 10" produce less emissions, increase overall power generation efficiency, and reduce fuel consumption over conventional gas turbine engines. A flexible combination of power provided for propulsion can be achieved with combined cycle power generation systems 10, 10', and 10". In addition, onboard power generation can be used to enable distributed propulsion, which has higher propulsive efficiencies than conventional tube and wing methods.

Discussion of Possible Embodiments

The following are non-exclusive descriptions of possible embodiments of the present invention.

A combined cycle power generation system for an aircraft includes fuel cell and supercritical $CO_2$ cycles. The fuel cell cycle includes a compressor and turbine disposed on a first shaft, a fuel cell in fluid communication with the compressor and a fuel source, and a combustor in fluid communication with the fuel cell and the turbine. The combustor is configured to combust partially spent fuel from the fuel cell and produce combustion exhaust gas for delivery to the turbine. The supercritical $CO_2$ cycle includes a compressor and turbine disposed on a second shaft, a supercritical $CO_2$ fluid circuit in thermal communication with the combustor and configured to deliver $CO_2$ to the turbine and compressor, and a heat exchanger in thermal communication with the supercritical $CO_2$ fluid circuit and a source of cooling fluid. A mechanical linkage is configured to transfer power from the second shaft to the first shaft.

The combined cycle power generation system of the preceding paragraph can optionally include, additionally and/or alternatively, any one or more of the following features and/or configurations:

A further embodiment of the foregoing combined cycle power generation system, wherein the supercritical $CO_2$ fluid circuit can be configured to deliver the $CO_2$ from the second compressor to the combustor.

A further embodiment of any of the foregoing combined cycle power generation systems, wherein the combustor can be configured to transfer thermal energy to the $CO_2$ in the supercritical $CO_2$ fluid circuit.

A further embodiment of any of the foregoing combined cycle power generation systems, wherein the supercritical $CO_2$ fluid circuit can be configured to deliver the $CO_2$ from the combustor to an inlet of the second turbine.

A further embodiment of any of the foregoing combined cycle power generation systems, wherein an outlet of the second turbine can be in fluid communication with an inlet of the first heat exchanger.

A further embodiment of any of the foregoing combined cycle power generation systems, wherein an outlet of the first heat exchanger can be in fluid communication with an inlet of the second compressor.

A further embodiment of any of the foregoing combined cycle power generation systems, wherein the mechanical linkage can include a reduction gearbox.

A further embodiment of any of the foregoing combined cycle power generation systems, wherein the supercritical $CO_2$ cycle can further include a third heat exchanger in fluid communication with the second turbine and the second heat exchanger.

A further embodiment of any of the foregoing combined cycle power generation systems, wherein the supercritical $CO_2$ cycle can further include a fourth heat exchanger in fluid communication with the second turbine and the third heat exchanger.

A further embodiment of any of the foregoing combined cycle power generation systems, wherein the supercritical $CO_2$ cycle can further included a third compressor disposed on the second shaft and in fluid communication with the fourth heat exchanger.

A further embodiment of any of the foregoing combined cycle power generation systems, wherein an outlet of the fourth heat exchanger can be in fluid communication with each of an inlet of the third compressor and an inlet of the third heat exchanger.

A further embodiment of any of the foregoing combined cycle power generation systems, wherein the fuel cell cycle can further include a heat exchanger in fluid communication with the combustor and the first compressor and configured to transfer thermal energy from the combustion exhaust gas to the first compressed fluid.

A further embodiment of any of the foregoing combined cycle power generation systems, wherein the heat exchanger can be disposed in fluid communication with the first turbine.

A further embodiment of any of the foregoing combined cycle power generation systems, wherein the supercritical $CO_2$ fluid circuit can fluidly connect an outlet of the second turbine to an inlet of the second compressor and can fluidly connect an outlet of the second compressor to an inlet of the second turbine.

A method of powering an aircraft includes operating a fuel cell cycle, operating a supercritical $CO_2$ cycle, and transferring power from the supercritical $CO_2$ cycle to the fuel cell cycle. Operating a fuel cell cycle includes drawing air into a first compressor, heating the air to a temperature of at least 600 degrees Celsius, delivering the air and a fuel to a fuel cell, reacting the air and fuel to generate power, delivering unburned fuel from the fuel cell to a combustor, burning the fuel in the combustor to produce an exhaust gas, and delivering the exhaust gas to a first turbine, wherein the first turbine drives the first compressor. Operating a supercritical $CO_2$ cycle includes circulating $CO_2$ in a fluid circuit, wherein circulating the $CO_2$ comprises heating the $CO_2$, expanding the heated $CO_2$ through a second turbine, cooling the $CO_2$ exiting the second turbine, and compressing the cooled $CO_2$.

The method of the preceding paragraph can optionally include, additionally and/or alternatively, any one or more of the following features, configurations, and/or steps:

A further embodiment of the foregoing method, wherein transferring power can include connecting a first shaft having the first turbine and the first compressor with a second shaft having the second turbine and second compressor via a reduction gearbox.

A further embodiment of any of the foregoing methods, wherein heating the $CO_2$ can include transferring thermal energy from the combustor to the $CO_2$ in the supercritical $CO_2$ fluid circuit.

A further embodiment of any of the foregoing methods, wherein cooling the $CO_2$ can include transferring thermal energy from the $CO_2$ to high altitude air.

A further embodiment of any of the foregoing methods, wherein cooling the $CO_2$ can further include transferring thermal energy from $CO_2$ exiting the second compressor to $CO_2$ exiting the second turbine.

A further embodiment of any of the foregoing methods, wherein compressing the $CO_2$ can include compressing a first portion of the $CO_2$ in the supercritical $CO_2$ fluid circuit with the second compressor and compressing a second portion of the $CO_2$ in the supercritical $CO_2$ fluid circuit with a third compressor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combined cycle power generation system for an aircraft comprising:
   a fuel cell cycle comprising:
      a first compressor disposed on a first shaft;
      a first turbine disposed on the first shaft;
      a fuel cell in fluid communication with the first compressor and a fuel source, the fuel cell being configured to receive first compressed fluid from the first compressor and fuel from the fuel source; and
      a combustor in fluid communication with the fuel cell and the first turbine, the combustor being configured to combust partially spent fuel from the fuel cell and produce combustion exhaust gas for delivery to the turbine;
   a supercritical $CO_2$ cycle comprising:
      a second compressor disposed on a second shaft;
      a second turbine disposed on the second shaft;
      a supercritical $CO_2$ fluid circuit in thermal communication with the combustor and configured to deliver $CO_2$ to the second turbine and the second compressor; and
      a first heat exchanger in thermal communication with the supercritical $CO_2$ fluid circuit and a source of cooling fluid; and
   a mechanical linkage configured to transfer power from the second shaft to the first shaft.

2. The combined cycle power generation system of claim 1, wherein the supercritical $CO_2$ fluid circuit is configured to deliver the $CO_2$ from the second compressor to the combustor.

3. The combined cycle power generation system of claim 2, wherein the combustor is configured to transfer thermal energy to the $CO_2$ in the supercritical $CO_2$ fluid circuit.

4. The combined cycle power generation system of claim 3, wherein the supercritical $CO_2$ fluid circuit is configured to deliver the $CO_2$ from the combustor to an inlet of the second turbine.

5. The combined cycle power generation system of claim 4, wherein an outlet of the second turbine is in fluid communication with an inlet of the first heat exchanger.

6. The combined cycle power generation system of claim 5, wherein an outlet of the first heat exchanger is in fluid communication with an inlet of the second compressor.

7. The combined cycle power generation system of claim 6, wherein the mechanical linkage comprises a reduction gearbox.

8. The combined cycle power generation system of claim 6, wherein the supercritical $CO_2$ cycle further comprises a third heat exchanger in fluid communication with the second turbine and the second heat exchanger.

9. The combined cycle power generation system of claim 8, wherein the supercritical $CO_2$ cycle further comprises a fourth heat exchanger in fluid communication with the second turbine and the third heat exchanger.

10. The combined cycle power generation system of claim 9, wherein the supercritical $CO_2$ cycle further comprises a third compressor disposed on the second shaft and in fluid communication with the fourth heat exchanger.

11. The combined cycle power generation system of claim 10, wherein an outlet of the fourth heat exchanger is in fluid communication with each of an inlet of the third compressor and an inlet of the third heat exchanger.

12. The combined cycle power generation system of claim 1, wherein the fuel cell cycle further comprises a heat exchanger in fluid communication with the combustor and the first compressor and configured to transfer thermal energy from the combustion exhaust gas to the first compressed fluid.

13. The combined cycle power generation system of claim 12, wherein the heat exchanger is disposed in fluid communication with the first turbine.

14. The combined cycle power generation system of claim 1, wherein the supercritical $CO_2$ fluid circuit fluidly connects an outlet of the second turbine to an inlet of the second compressor and fluidly connects an outlet of the second compressor to an inlet of the second turbine.

15. A method of powering an aircraft, the method comprising:
    operating a fuel cell cycle by:
        drawing air into a first compressor;
        heating the air to a temperature of at least 600 degrees Celsius;
        delivering the air and a fuel to a fuel cell;
        reacting the air and fuel to generate power;
        delivering unburned fuel from the fuel cell to a combustor;
        burning the fuel in the combustor to produce an exhaust gas; and
        delivering the exhaust gas to a first turbine, wherein the first turbine drives the first compressor, the first turbine and first compressor disposed on a first shaft;
    operating a supercritical $CO_2$ cycle by:
        circulating $CO_2$ in a fluid circuit, wherein circulating the $CO_2$ comprises:
            heating the $CO_2$;
            expanding the heated $CO_2$ through a second turbine disposed on a second shaft;
            cooling the $CO_2$ exiting the second turbine; and
            compressing the cooled $CO_2$ with a second compressor disposed on the second shaft; and
    transferring power from the supercritical $CO_2$ cycle to the fuel cell cycle, wherein transferring power comprises transferring power from the second shaft to the first shaft via a mechanical linkage.

16. The method of claim 15, wherein the mechanical linkage comprises a reduction gearbox.

17. The method of claim 16, wherein heating the $CO_2$ comprises transferring thermal energy from the combustor to the $CO_2$ in the supercritical $CO_2$ fluid circuit.

18. The method of claim 17, wherein cooling the $CO_2$ comprises transferring thermal energy from the $CO_2$ to high altitude air.

19. The method of claim 18, wherein cooling the $CO_2$ further comprises transferring thermal energy from $CO_2$ exiting the second compressor to $CO_2$ exiting the second turbine.

20. The method of claim 19, wherein compressing the $CO_2$ comprises compressing a first portion of the $CO_2$ in the supercritical $CO_2$ fluid circuit with the second compressor and compressing a second portion of the $CO_2$ in the supercritical $CO_2$ fluid circuit with a third compressor.

* * * * *